US005938950A

United States Patent [19]

Gay et al.

[11] Patent Number: 5,938,950

[45] Date of Patent: Aug. 17, 1999

[54] PLASMA TORCH WITH IMPROVED GAS-TIGHTNESS

[75] Inventors: Christain Gay, La Chapelle St Ursin; Patrice Fournier, Trouy-Bourg; Gilles Guillot; Emmanuel Mornay, both of Bourges, all of France

[73] Assignee: Giat Industries, France

[21] Appl. No.: 08/954,036

[22] Filed: Oct. 20, 1997

[51] Int. Cl.$^{6}$ ...................................................... B23K 10/00

[52] U.S. Cl. ................................ 219/121.54; 219/121.48; 219/121.52; 102/202.5; 102/202.9

[58] Field of Search .......................... 219/121.52, 121.51, 219/121.48, 121.54, 121.57; 102/202.2, 202.3, 202.4, 202.5, 202.7, 202.8, 202.9

[56] References Cited

U.S. PATENT DOCUMENTS

| | | | |
|---|---|---|---|
| 5,261,315 | 11/1993 | Marinos | 102/202.7 |
| 5,287,791 | 2/1994 | Chaboki et al. . | |

FOREIGN PATENT DOCUMENTS

| | | |
|---|---|---|
| 0338458 | 10/1989 | European Pat. Off. . |
| 2276801 | 10/1994 | United Kingdom . |

*Primary Examiner*—Mark Paschall
*Attorney, Agent, or Firm*—Parkhurst & Wendel, L.L.P.

[57] ABSTRACT

The plasma torch according to the invention comprises an anode and a cathode separated by a capillary tube made of an electrically insulating material which can be ablated through the action of the plasma. It is characterized in that the anode incorporates a conductive casing closed at a first end casing inside which the capillary tube is positioned.

9 Claims, 1 Drawing Sheet

PLASMA TORCH WITH IMPROVED GAS-TIGHTNESS

BACKGROUND OF THE INVENTION

The present invention relates to plasma torches.

A plasma torch is a system which enables high pressure (around 500 MPa) gases to be generated by a high voltage (around 20 kV) electric discharge caused between two electrodes.

Plasma torches are used in industry, for example, to cut conductive materials, or to destroy certain products or materials, or to apply metal coatings. They are also used in the field of armaments to generate pressure enabling a projectile to be fired. U.S. Pat. No. 4,895,062, which describes a weapon employing a plasma torch, is an example of such use.

Known plasma torches comprise an anode and a cathode separated by a capillary tube made of a material which is both electrically insulating and likely to breakdown to generate a plasma (for example, a plastic material). The electrical discharge between anode and cathode is triggered by a copper fuse, or fuse made of another conductive material. The electric arc thus created produces a plasma which ablates the wall of the capillary tube thereby generating high pressure, high temperature, light gases.

These gases are used either to directly accelerate the projectile, or to vaporize a fluid (for example, water) enabling the gas volume to be increased.

In known plasma torches, the anode and cathode fixed on opposing sides of a support tube which ensures the rigidity of the torch and the radial confinement of the generated plasma.

The cathode is ring-shaped so as to enable the plasma jet to exit axially through the cathode.

As a result, during operation the pressure level at the anode is greater than that developed at the cathode.

In practical terms, pressures of around 400 MPa have been measured at the cathode against 600 MPa at the anode.

Such a difference in pressure has a negative effect upon the mechanical strength of the torch. It can also cause a deterioration of the sealing between the anode and the support leading to the emission of plasma jets from the anode out of the torch.

SUMMARY OF THE INVENTION

It is, therefore, an object of the invention to propose a plasma torch.

Thus, the invention proposes a plasma torch whose mechanical strength and gas-tightness are improved.

The object of the invention is a plasma torch comprising an anode and a cathode, separated by a capillary tube made of an electrically insulating material which can be ablated through the action of the plasma, creating a torch wherein that the anode incorporates a conductive casing closed at a first end, inside which the capillary tube is positioned.

According to a particular embodiment, the capillary tube is separated from the anode by an insulating sheath.

Advantageously, the anode casing extends longitudinally substantially up to the cathode, the insulating sheath surrounding the cathode at least partially.

The cathode can incorporate a conical support which is positioned in a matching conical housing of the conductive casing, the insulating sheath comprising a flared-out part which is placed between the conical support of the cathode and the conical housing of the conductive casing.

The anode can incorporate a base forming the foot of an arc arranged at the bottom of the conductive casing.

The cathode can incorporate a ring-shaped sealing lip applied against the insulating sheath and marking out a bore accommodating one, reduced-diameter, end of the capillary tube.

The cathode can incorporate an axial housing in which a conductive ring forming the foot of an arc is arranged.

The torch according to the invention can incorporate a tubular insulating sleeve surrounding the anode and ensuring its attachment to the cathode.

It can also incorporate at least one O-ring placed between the tubular sleeve and the insulating sheath.

BRIEF DESCRIPTION OF THE DRAWING

The drawing is a longitudinal section of the plasma torch according to the present invention.

DETAILED DESCRIPTION

Figure 1:
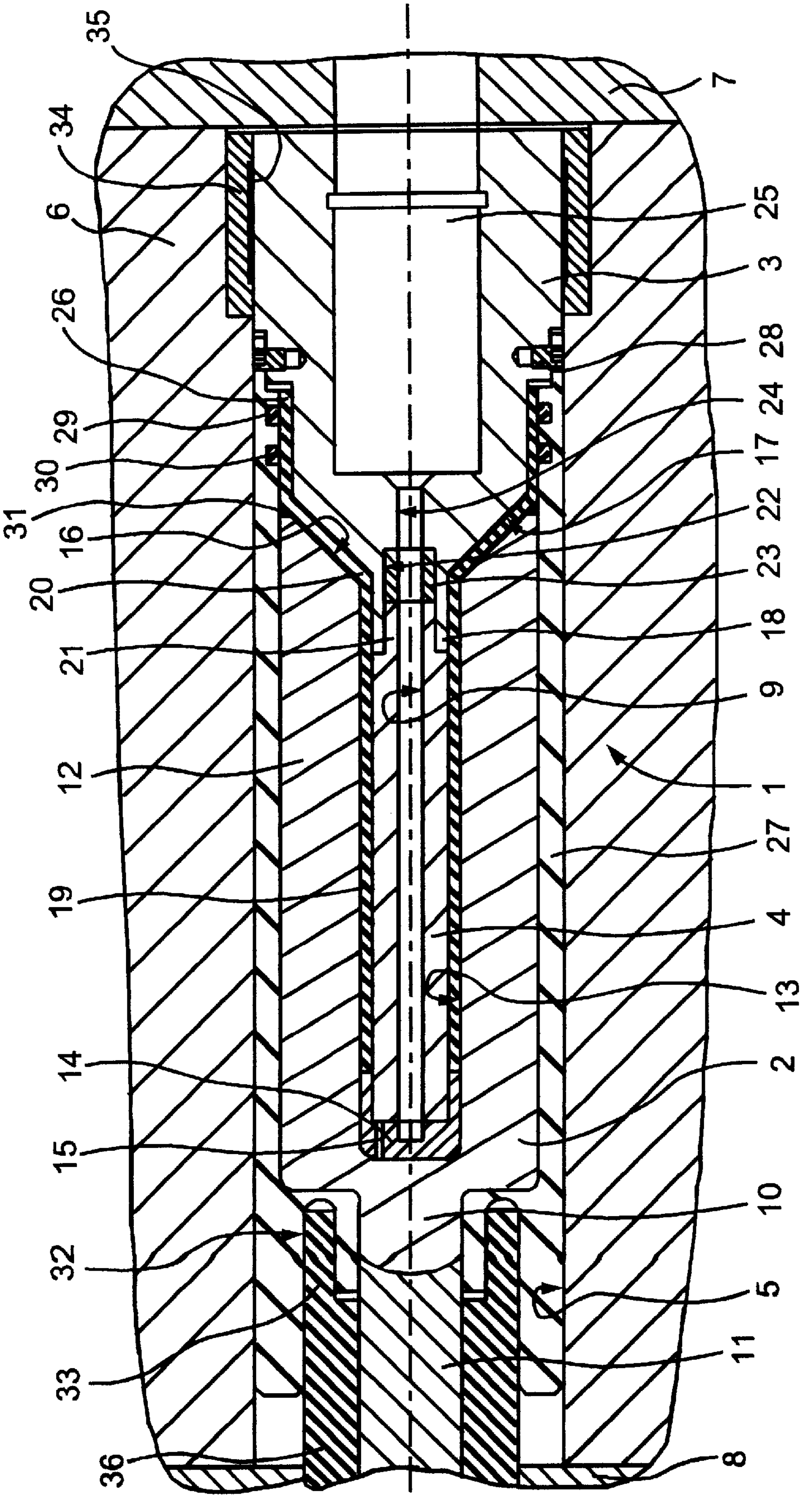

This plasma torch 1 comprises an anode 2 and a cathode 3 separated by a capillary tube 4.

Torch 1 globally has a revolutionary symmetry. It is set into place in a bore 5 arranged on a support 6, which in this case is a weapon (not shown in detail), which comprises a barrel 7 and a breech plate 8.

The capillary tube 4 is made of an electrically insulating material able to ablate, that is able to generate light gases through the action of the plasma. The capillary tube will, for example, be made of a plastic material such as polyethylene. It incorporates an axial bore 9 inside which a fuse (not shown), for example a copper wire, is placed.

Anode 2 is constituted from a metallic casing incorporating a reduced-diameter bottom 10 and a cylindrical body 12.

Bottom 10 is intended to accommodate an electrical contact 11 which is mechanically integral with breech plate 8.

Cylindrical body 12 has an axial bore 13 which houses capillary tube 4 and a base 14 forming the foot of an arc.

Base 14 is made of a highly conductive material which has good mechanical strength whose function is to limit erosion due to the foot of the electric arc.

It incorporates a longitudinal channel 15 which enables the air trapped between bottom 10 and base 14 to be evacuated when the latter is set into position, thereby enabling base 14 to be applied tightly against the bottom to ensure good electrical contact.

Capillary tube 4 is separated from anode 2 by a cylindrical sheath 19, which is made of an electrically insulating material, for example a composite based on glass fibres.

The function of this sheath is to provide electrical insulation between the anode and the cathode.

The open end of anode 2 has a conical profile 16 which matches a conical support 17 arranged on cathode 3. This conical profile facilitates assembly of the cathode and ensures the co-axiality of these two parts.

Insulating sheath 19 incorporates a flared-out part 20 which is placed between conical support 17 of cathode 3 and conical housing 16 of the conductive casing of anode 2 and avoids electrical short-circuiting at this point between the anode and the cathode.

Cathode 3 incorporates a ring-shaped sealing lip 18 which is applied against insulating sheath 19 and which marks out a bore accommodating a reduced-diameter end 21 of capillary tube 4.

Lip 18 is intended to deform through the effect of the plasma pressure generated by the torch to prevent any plasma from leaking between cathode 3 and insulating sheath 19, leaks which would have a negative effect on the effectiveness of the torch and which would deteriorate the electrical insulation.

So as to locate the foot of the electric arc, cathode 3 also incorporates an axial housing 22 in which a conductive ring 23 forming the foot of an arc is placed. This ring is made of the same material as base 14.

Cathode 3 has an axial opening 24 which allows the inside of the torch to communicate with a chamber 25 intended to receive a projectile (not shown) and possibly also a gas-generating material (for example, water).

A tubular insulating sleeve 27 surrounds anode 2 and ensures its attachment to cathode 3 by means of radial screws 28.

Sleeve 27 completes the electrical insulation between anode and cathode. O-rings 29, 30, 31 are placed between sleeve 27 and insulating sheath 19. They prevent the formation of an electric arc level with the play on the radial assembly.

Current is brought to cathode 3 by means of a contact ring 34 which remains integral with support 6 and which carries at least two flexible longitudinal tabs 35.

The latter ensure good electrical contact despite the presence of radial play between cathode 3 and support 6, play intended to facilitate the installation and replacement of torch 1.

Sleeve 27 also incorporates a ring-shaped machined part 32 intended to accommodate and guide a collar 33 integral with an insulating sleeve 36 which surrounds contact 11 and electrically insulates it from breech plate 8.

This specific arrangement prevents the formation of an electric arc between support 6 and anode 2.

This torch operates as follows.

A difference of electrical potential of around 20 kilo volts is applied between anode 2 and cathode 3.

The electrical current is applied to the anode via electrical contact 11 and to the cathode via support 6 and contact ring 34.

Electrical insulation is provided by sleeve 36 surrounding contact 11, insulating sleeve 27, O-rings 29,30 and 31 and insulating sheath 19.

Thus, anode and cathode are connected together only by means of the fuse positioned inside capillary tube 4. This fuse triggers an electric arc between anode and cathode, an arc which is maintained and which causes the ablation of the constitutive material of the capillary tube and the generation of a plasma which exits torch 1 via axial opening 24.

Because its bottom 10 is of a single piece, anode 2, proposed by the invention, prevents any leakage of plasma to the rear of the torch (towards contact 11).

It also enables the mechanical strength of the torch to be improved, as the torch possess a solid structure, formed in a single piece, there where the generated pressure is at its maximum, that is at bottom 10 of anode 2.

Cylindrical body 12 of anode 2 surrounds capillary tube 4 over its full length. It holds the latter in place radially, and this despite the high pressures developed inside the torch. As a result, the torch offers excellent mechanical strength for a minimal radial bulk.

The torch according to the invention can be used in the field of armaments to fire high-velocity projectiles (over 2000 m/s).

It can also be used in the civil field for cutting operations or material destruction or to carry out material coatings.

The aforementioned uses of the improved plasma torch are for illustrative purposes only. It can be appreciated by those of ordinary skill in the art that various modifications and embodiments of the present invention can be used that are within the spirit of the invention as defined by the scope of the appended claims.

We claim:

1. A plasma torch comprising:

an anode;

a cathode;

a capillary tube separating the anode from the cathode, and comprising an electrically insulating material which can be ablated through the action of the plasma;

the anode having an electrically conductive casing closed at a first end; and the capillary tube is enclosed entirely within the electrically conductive casing of the anode.

2. A plasma torch according to claim 1, wherein the capillary tube is separated from the anode by an insulating sheath.

3. A plasma torch according to claim 2, wherein the anode casing extends longitudinally substantially up to the cathode the insulating sheath surrounding the cathode at least partially.

4. A plasma torch according to claim 3, wherein the cathode includes a conical support which is positioned in a matching conical housing of the conductive casing, the insulating sheath comprising a flared-out part which is placed between the conical support of the cathode and the conical housing of the conductive casing.

5. A plasma torch according to claim 1, wherein the anode includes a base forming the foot of an arc arranged at the bottom of the conductive casing.

6. A plasma torch according to claim 2, wherein the cathode includes a ring-shaped sealing lip applied against the insulating sheath and defining a bore accommodating one, reduced-diameter, end of the capillary tube.

7. A plasma torch according to claims 1 the cathode includes an axial housing in which a conductive ring forming the foot of an arc is arranged.

8. A plasma torch according to one of claims 1 to 7, characterized in that it incorporates a tubular insulating sleeve (27) surrounding the anode (2) and ensuring its attachment to the cathode (3).

9. A plasma torch according to claim 8, further comprising at least one O-ring placed between the tubular insulating sleeve and the insulating sheath.

* * * * *